(12) United States Patent
Colucciello et al.

(10) Patent No.: US 8,954,046 B2
(45) Date of Patent: Feb. 10, 2015

(54) PRIVATE LABELED MOBILE APPLICATIONS

(76) Inventors: Jose Colucciello, Melbourne Beach, FL (US); Thomas F. Kari, Jr., Lindenhurst, NY (US)

(*) Notice: Subject to any disclaimer, the term of this patent is extended or adjusted under 35 U.S.C. 154(b) by 4 days.

(21) Appl. No.: 13/237,263

(22) Filed: Sep. 20, 2011

(65) Prior Publication Data

US 2013/0072168 A1     Mar. 21, 2013

(51) Int. Cl.
| | |
|---|---|
| *H04M 3/00* | (2006.01) |
| *H04W 4/00* | (2009.01) |
| *G06F 9/44* | (2006.01) |
| *G06F 9/00* | (2006.01) |
| *H04M 1/00* | (2006.01) |
| *G06F 9/445* | (2006.01) |
| *G06Q 30/06* | (2012.01) |

(52) U.S. Cl.
CPC . *H04W 4/00* (2013.01); *G06F 8/00* (2013.01); *G06F 9/00* (2013.01); *H04M 1/00* (2013.01); *H04W 4/001* (2013.01); *H04W 4/003* (2013.01); *G06F 8/60* (2013.01); *G06Q 30/06* (2013.01)
USPC .......................... 455/418; 455/419; 455/414.1

(58) Field of Classification Search
CPC ............... H04L 67/306; H04L 67/303; H04M 1/72525; H04M 1/72563; H04W 8/22

USPC ............ 455/414.1, 517, 556.1, 566, 90.1, 95, 455/43.3
See application file for complete search history.

(56) References Cited

U.S. PATENT DOCUMENTS

| | | | | |
|---|---|---|---|---|
| 2008/0133336 | A1* | 6/2008 | Altman et al. | 705/10 |
| 2009/0156190 | A1* | 6/2009 | Fisher | 455/418 |
| 2010/0298010 | A1* | 11/2010 | Roth et al. | 455/466 |
| 2011/0302571 | A1* | 12/2011 | O'Farrell et al. | 717/170 |
| 2012/0084399 | A1* | 4/2012 | Scharber et al. | 709/219 |

* cited by examiner

*Primary Examiner* — Kiet Doan
*Assistant Examiner* — Dung Lam
(74) *Attorney, Agent, or Firm* — Oakwood Law Group, LLP

(57) ABSTRACT

Currently technology encourages use of mobile applications, which executes programs on mobile devices that formerly only operated on personal computers. These mobile applications, "mobile apps" typically run on smart phone style devices such as iPhone, Android based and Blackberry based phones. Many mobile applications are service oriented and are sold or provided to the end user by the Dealer of these products and services. These applications are typically branded in the name of the manufacturer or provider of these products or services, using the manufacturer's graphic theme and logos. In many cases, the Dealer of the products or services would prefer that the mobile application they provide to their customer base be branded with their company's name, color themes and logos. Unfortunately, it is very expensive and cumbersome to generate custom mobile applications that are branded in the image and name of the Dealer.

6 Claims, 1 Drawing Sheet

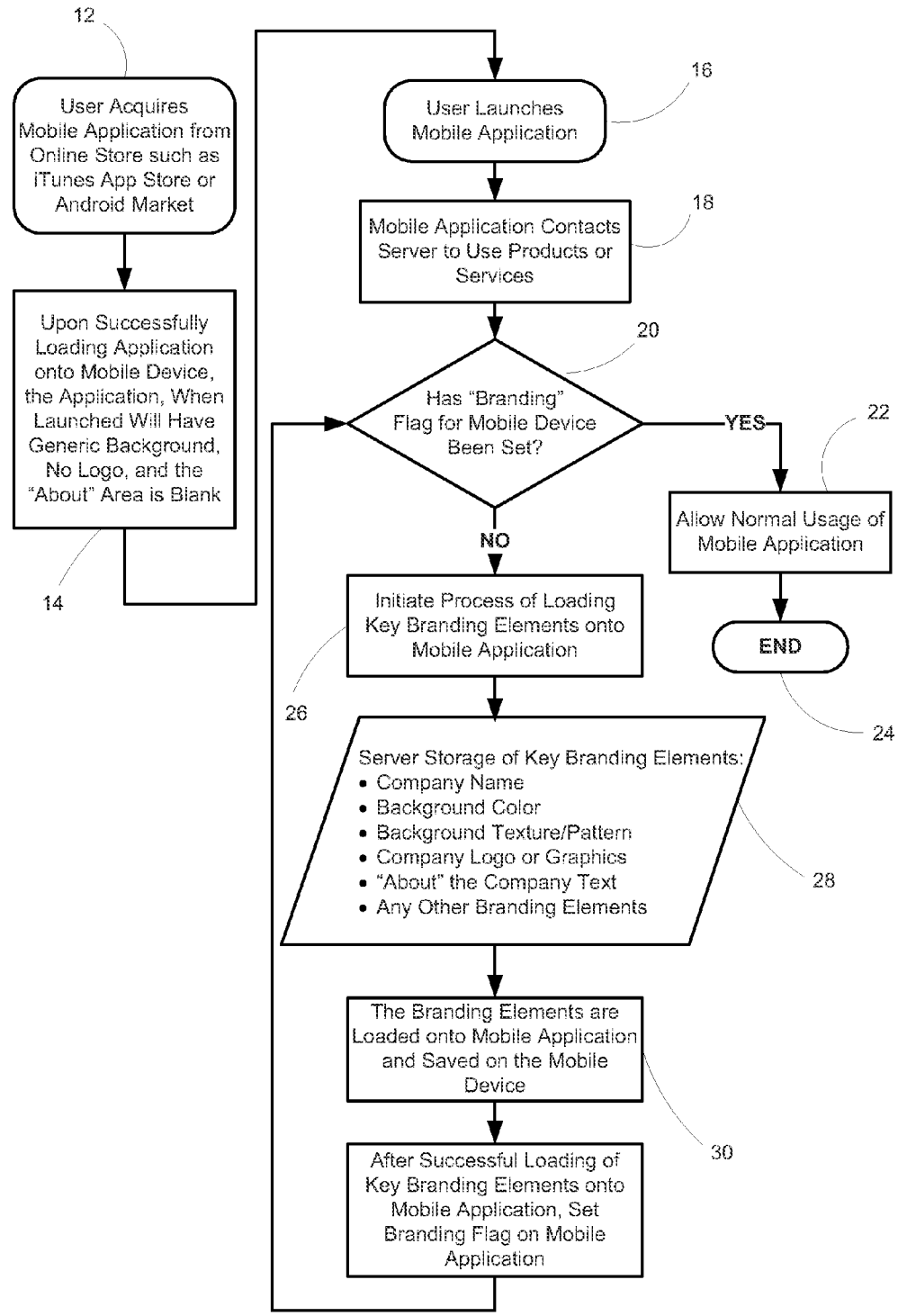

PRIVATE LABELED MOBILE APPLICATIONS

BACKGROUND OF THE INVENTION

1. Field of the Invention

This invention provides a method that allows Dealers or resellers of products or services to offer their customer base mobile applications that are "private label" branded in their company's image. This is crucial in helping the Dealer build their brand equity as well as giving the perception that the Dealer is offering products and services that have been designed and developed within their own organization.

2. Description of Related Art

This invention provides a method of private labeling of the mobile applications that the Dealer provides to their customer base that allows them to utilize their products or services.

It provides the Dealer with the ability to offer their customers a "branded" mobile application that includes key elements that brand the application to the Dealer's company, which may include the Dealer's company name, background color, logo or custom graphic and "about us" verbiage that will automatically be placed into the mobile application.

The invention includes a server system that stores the private labeled key elements of the mobile applications utilized by a multitude of Dealers who market the products and services controlled by the mobile application. Each dealer will load and maintain their own custom key branding elements on the server system.

At the time the Dealer's customer loads the mobile application on their mobile device, the mobile application will have a generic default appearance, with no branding, logos or Dealer names.

At the time of the first use of the mobile app, the system will automatically query the server system based on the Dealer's unique ID and locates the proper private labeled elements that have been loaded by the Dealer. The system will then automatically load all of the branded key elements onto the mobile device.

SUMMARY OF THE INVENTION

In an exemplary embodiment of the present invention, there is disclosed a computer implemented method that allows a server to offer customers branded mobile applications that are branded in the company's image to a user's mobile device comprising the steps of:

providing user's mobile device with mobile applications from an on-line store;

launching the mobile applications from the mobile device to contact the server to use products or services;

determining if branding flag for the mobile device has been set; and allowing normal usage of mobile application if branding flag has been set The more important features of the invention have thus been outlined in order that the more detailed description that follows may be better understood and in order that the present contribution to the art may better be appreciated. Additional features of the invention will be described hereinafter and will form the subject matter of the claims that follow.

Before explaining at least one embodiment of the invention in detail, it is to be understood that the invention is not limited in its application to the details of construction and the arrangements of the components set forth in the following description or illustrated in the drawings. The invention is capable of other embodiments and of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The foregoing has outlined, rather broadly, the preferred feature of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention and that such other structures do not depart from the spirit and scope of the invention in its broadest form.

BRIEF DESCRIPTION OF THE DRAWINGS

Other aspects, features, and advantages of the present invention will become more fully apparent from the following detailed description, the appended claim, and the accompanying drawings in which similar elements are given similar reference numerals.

FIG. 1 is a flow diagram of a method that allows a dealer to offer its customer base mobile applications that are branded in the company's image.

DESCRIPTION OF THE PREFERRED EMBODIMENT

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated devices, and such further applications of the principles of the invention as illustrated therein being contemplated as would normally occur to one skilled in the art to which the invention relates.

Referring to FIG. 1, there is disclosed a method that allows a dealer to offer its customer base mobile applications that are branded in the company's image 10. The method may be performed in real time on a computer or a mobile device, a smart phone style device such as an iPhone, Android based or Blackberry based phones. having application software installed to cause the mobile device to operate in accordance with the method. The computer system is comprised of a server, a personal computer or a mobile device, The server, computer or mobile device has memory to store the software and a processor to execute the method. The computer also has input means typical of a personal computer, such as a keyboard, etc.

At the start, block 12, user acquires mobile application from online store such as iTunes App Store or Android Market or any other store that offers/sells mobile applications.

Upon successfully loading the Application onto mobile device, the Application, when launched will have generic background, no logo and the "About" area is blank, block 14. At this time the User launches the Mobile application, block 16, and the mobile application contacts the server to use products of services, block 18. It is now determined if the "branding" flag for the mobile device has been set, block 20. If the flag has been set, YES, normal usage of the Mobile application is allowed, block 22, and the method ends, block 24.

If the flag has not been set, NO, the process of loading Key Branding Elements onto the Mobile Application is initiated, block 26. The Key Branding Elements which are loaded onto the Mobile Application, block 28, are Company name,
Background Color,
Background texture/Pattern,
Company Logo or Graphs,
Text about the company,
Any other branding elements.

After the Branding Elements are loaded onto the Mobile Application, they are saved on the mobile device, block 30, and the branding flag on the mobile application is set, block 32. Upon setting the branding flag on the mobile application the method advances to block 20.

While there have been shown and described and pointed out the fundamental novel features of the invention as applied to the preferred embodiments, it will be understood that the foregoing is considered as illustrative only of the principles of the invention and not intended to be exhaustive or to limit the invention to the precise forms disclosed. Obvious modifications or variations are possible in light of the above teachings. The embodiments discussed were chosen and described to provide the best illustration of the principles of the invention and its practical application to enable one of ordinary skill in the art to utilize the invention in various embodiments and with various modifications as are suited to the particular use contemplated All such modifications and variations are within the scope of the invention as determined by the appended claims when interpreted in accordance with the breadth to which they are entitled.

What is claimed is:

1. A computer implemented method that allows a server system to offer a Dealer's customers branded mobile applications that are branded in the Dealer's company image to a user's mobile device comprising the steps of:

providing the user's mobile device with a mobile application from an on-line store;

launching the user's mobile application from the mobile device for the first time, the mobile application has a generic background;

upon launching, the processor of the mobile phone automatically querying a branding flag status on the server system or on the mobile phone to determine if the branding status flag for the mobile application on the user's mobile device has been set without first having a user input; and allowing normal usage of mobile application if the branding status flag has been set, and if the branding status flag has not been set, initiating a process of loading at least one Dealer Key Branding element onto said mobile application from the Dealer Server System;

saving the at least one Dealer Key Branding element on the user's mobile device;

setting a branding status flag on the user's mobile device; and allowing normal usage of the mobile application.

2. The computer implemented method of claim 1 wherein the Dealer Key Branding element is a Dealer company name or logo.

3. The computer implemented method of claim 1 wherein the Dealer Key Branding element is a background color, a texture or a pattern.

4. The computer implemented method of claim 1 wherein the Dealer Key Branding element is a description about the Dealer's company.

5. The computer implemented method of claim 1 wherein the mobile application automatically selects and installs the Dealer Key Branding element upon the first use of the mobile application after the mobile application has been loaded onto the mobile device.

6. The computer implementation method of claim 1 wherein a modification made to said at least one Dealer Key Branding element is tracked with a timestamp.

* * * * *